Patented Feb. 4, 1930

1,745,693

UNITED STATES PATENT OFFICE

ARTHUR W. HIXSON, OF LEONIA, NEW JERSEY, AND NILS ERIK ALVAR HUGOSON, OF NEW YORK, N. Y., ASSIGNORS, BY DIRECT AND MESNE ASSIGNMENTS, TO STANDARD BRANDS INCORPORATED, OF DOVER, DELAWARE, A CORPORATION OF DELAWARE

YEAST AND METHOD OF MAKING THE SAME

No Drawing. Application filed January 14, 1921. Serial No. 437,315.

This invention relates to yeast and to a process of propagating the same, and has for an object an improved procedure which is efficient and economical and by which yeast, which is robust, of good color, baking strength and keeping qualities, is produced.

Another object is to provide a method of propagating yeast in which the yeast nutrients are introduced into the nutrient solution in a manner such as to obtain a buffer action whereby the hydrogen ion concentration remains fairly constant during the period of propagation.

Still another object is to provide a method of propagating yeast in which a highly efficient nitrogen supplying material is employed, namely carbamide or urea, whereby yeast of good color and quality and baking strength is readily produced from a relatively small quantity of propagating materials.

Other objects of the invention will in part be obvious and will in part appear hereinafter.

Yeast for baking purposes has been grown commercially on a liquid of organic origin containing sugars, and having in it sufficient nitrogen, linked as is the nitrogen of proteins, as well as sufficient inorganic substances to sustain the growth. The principal sources of raw material for this type of yeast have been grain extracts, and the various kinds of beet and cane molasses.

The extracts of grain contain all the substances necessary for yeast growth, but it has been the custom for many years in practically all yeast factories in which molasses yeast is manufactured, to supply nitrogen in the form of malt sprouts or yeast extracts and to supply phosphorus by the addition of phosphates such as superphosphate or ammonium phosphate. The practice of blowing air through the medium has also been resorted to in the past.

In the present invention, we have discovered a process of manufacturing yeast by which the amount of yeast obtained may be increased and the yeast so obtained is specially adapted to dry by the drying process disclosed and claimed in the patent to Arthur W. Hixson, granted June 27, 1922, No. 1,420,630, the yeast being made more resistant under the process of drying than yeast made in other ways.

We have found that there are several circumstances occurring during fermentation which interfere with the growth of yeast attaining its maximum. In practicing the process, we employ molasses, either beet or cane molasses as a raw material, and we have found that the presence of reducing substances, such as sulfur dioxid, interfere with the maximum yeast growth.

In addition, the formation of considerable quantities of acid during the first part of the fermentation process is detrimental, and in the present invention, we find it advantageous to add salts to be employed as "buffer" salts in a manner resembling the manner by which the human body maintains the hydrogen-ion concentration of the blood at a practically constant level, to maintain the acidity of the fermenting liquid fairly constant.

During the fermenting process, the reproduction of yeast by budding tends to form clumps or aggregates in which the interior cells are prevented by the exterior cells from coming in contact with a maximum amount of food material. This prevents the complete growth of the interior cells and the violent aeration generally practiced is insufficient to break up these aggregates. We have found that this difficulty may be overcome by first adding to the liquid in the fermenting tanks, a quantity of a soluble sulphate adapted to supply nutrients to yeast and which is non-toxic or innocuous to yeast, as for example, ammonium sulphate in amounts equal to substantially 1% of the molasses used and then continuing the neutralization of the fermenting liquid by means of lime, forming a quantity of calcium sulfate. The precipitation of the calcium sulfate which takes place slowly and produces crystalline precipitates, tends to disintegrate the clumps of yeast, and thus overcome this disadvantage.

In practicing the process, the molasses is first diluted with about five times its weight of water and a suitable active oxidizing agent, such as chlorid of lime, is added in the proportion of about 1/10 of 1 per cent of the molasses content, the amount varying with the quantity of reducing agents present, the chlorid of lime being best suspended in a small quantity of water and added to the diluted mixture by stirring.

The optimum hydrogen-ion concentration for the growth of yeast is in the neighborhood of pH=6. By arranging a mixture of so-called buffer salts, the acidity of the fermenting liquid may be held fairly constant in this neighborhood. This occurs because of the so-called "buffer action" of the salts and continues so long as the production of acid does not exceed the amount which the salts present are capable of partially neutralizing or "buffering". Since the quantity of any buffer mixture would have to be very large to take care of all of the acid formed during an entire fermentation, it is advisable to cut this down by periodically, for instance hourly, neutralizing part of the acid formed by adding an alkali. We find it advantageous to employ lime, preferably as milk of lime. This periodical addition of alkali, provided too much is not added, does not prevent the regulation of the acidity by the phosphates from being continuous, and it is this automatic and continuous regulation that is the important thing.

By "buffer action", is meant the ability to resist change in pH through the addition or loss of alkali or acid. Such effect is possessed by mixtures of the salts or di- and poly-basic acids. The most suitable are the salts of phosphoric acid and since it is advisable to avoid the introduction of an excess of alkali metals, we find it advantageous to use a mixture consisting of the primary and secondary ammonium salts or ortho-phosphoric acid, namely $NH_4H_2PO_4$ and $(NH_4)_2HPO_4$. If the mono-ammonium di-hydrogen phosphate and the mono-hydrogen-diammonium phosphate be used, they should be used in approximately the proportions of 96 parts of the former to 22 parts of the latter figuring on the anhydrous salts. The total weight of both phosphates most advantageous in my process as here described, is about one pound of mixed phosphates per twenty pounds of fermentable sugars.

In place of the primary and secondary ammonium salts or ortho-phosphoric acid, other mixture of salts or di- or other poly-basic acids may be employed, but care must be exercised in the selection, and salts employed whose presence in the liquid will have no harmful effect on the yeast and which are not readily decomposed under the conditions of fermentation. We have found that the salts above mentioned are best suited for use in practicing the process. The amount of the secondary phosphate added must be sufficient to practically withstand the acidity developed in the fermentation, during the intervals between the successive additions of lime, and the amount of the primary phosphate is dependent upon the secondary added.

As stated above the percentage of ammonium sulfate employed is generally substantially 1 per cent. of the molasses content, although larger proportions may be employed without detrimental effect. The sulfate is added to the fermentable solution and is slowly precipitated in the form of calcium sulfate by the lime added. The crystalline calcium sulfate moves rapidly through the liquid due to the agitation of the air and tends to disintegrate clumps of yeast and thus prevent the bad effects resulting. While the clumps cannot always be avoided during the last stages of fermentation, the yeast formed in the earlier stages of growth is sturdier and hence an improvement in the quality of the descendent yeast results.

The foregoing modifications are applicable to the general process of growing yeast on aerated molasses, to which may be added any of the ordinarily used sources of nitrogen. We have found, however, that a substance most admirably adapted to the purpose of furnishing the necessary nitrogen, and never hitherto used in the practice of propagating yeast, is carbamide, or urea, which when used in approximately the proportions outlined below serves as a very efficient nitrogen source, and is directed to be used in this connection.

In a typical embodiment of the invention, the fermentable solution is first prepared by adding 100 pounds of beet molasses to approximately 500 pounds of water. The chlorid of lime, or other oxidizing agent, is prepared by first suspending it in water. When chlorid of lime is used, from 0.1 to 0.2 pounds is suspended in a small quantity (about 15 pounds) of water, and it is then added to the diluted molasses by stirring for about 20 minutes. The period of time during which the stirring is continued is, of course, dependent upon the proper admixture of the solution of chlorid of lime and the rapidity of oxidation. Sufficient water is then added to the mixture to reduce the specific gravity to a point approximately below 1.25 and to substantially 1.02. Phosphoric acid in proper proportion is then added to the mixture, and we have found that about 50 cc. of concentrated phosphoric acid mixture in about 1 liter of water is sufficient. A mixture of di-hydrogen ammonium phosphate and di-ammonium hydrogen phosphate, as previously described, is then added. To 100 pounds of molasses, the amount of phosphate will be less than 5 pounds, and a mixture of from 2 to 2.5 pounds is generally sufficient. To the mixture, a pound of ammonium sulfate and 1.5 pounds of urea is added. During these additions, the temperature is adjusted to between 25° to 30° C.

When the added materials have been dissolved, in the fermenting tank, aeration is commenced and a suitable quantity, as for example, about 2.5 pounds of seed yeast, which, if desired, may previously have been suspended in water, is added. The temperature is maintained as above stated and the aeration continued for from 18 to 24 hours and preferably about 20 hours.

The lime may be added in any suitable form that will react with ammonium sulfate to form the insoluble calcium sulfate and may be added at any suitable periods. In the actual performance of the process, we have found that the addition of thin milk of lime equivalent to 125 grams of calcium hydroxid added to the liquid hourly from the third to the ninth hours gives excellent results.

We have found that the addition of urea in amount not exceeding 10 per cent of the sugars present is highly advantageous, and the urea may be added at the beginning of fermentation of periodically added during fermentation.

At the end of the fermenting process, the yeast is compressed out of the liquid in the usual manner and may be immediately dried.

While we have described in detail the preferred practice of my process, it is to be understood that the details of procedure may be widely varied without departure from the spirit of the invention of the scope of the subjoined claims.

Having described our invention, what we claim as new and desire to secure by Letters Patent, is:

1. In a process of manufacturing bakers' yeast with aeration in a yeast nutrient solution containing molasses, in combination, the improvements which include forming said yeast nutrient solution by a process which includes adding an active oxidizing agent to molasses and thereafter adding to the treated molasses a salt of a poly-basic acid in an amount sufficient to maintain in said solution an approximately constant hydrogen-ion concentration during an extended period of yeast propagation therein.

2. In a process of manufacturing bakers' yeast with aeration in a yeast nutrient solution containing molasses, in combination, the improvements which include forming said yeast nutrient solution by a process which includes adding chloride of lime to molasses and thereafter adding to the treated molasses a salt of poly-basic acid in an amount sufficient to maintain in said solution an approximately constant hydrogen-ion concentration during an extended period of yeast propagation therein.

3. In a process of manufacturing bakers' yeast with aeration in a yeast nutrient solution, the improvements which comprise forming said nutrient solution by a process which includes adding to a solution containing molasses and a non-toxic ammonium salt a buffering mixture of salts of poly-basic acids in such amounts as to maintain the hydrogen-ion concentration approximately constant during an extended period of yeast propagation therein, and propagating the yeast therein with aeration.

4. In a process of manufacturing bakers' yeast with aeration in a yeast nutrient solution, the improvements which comprise forming said nutrient solution by a process which comprises adding, to a solution containing molasses and a non-toxic ammonium salt, a buffering mixture of salts of poly-basic acids in such amounts as to maintain the hydrogen-ion concentration within a small range during an extended period of yeast propagation therein, periodically adding an alkali to the said nutrient solution during propagation of yeast therein, to assist in maintaining the hydrogen-ion concentration approximately constant, and propagating the yeast therein with aeration.

5. In a process of manufacturing bakers' yeast with aeration in a yeast nutrient solution, the improvements which comprise forming said nutrient solution by a process which includes adding, to a solution containing molasses and a non-toxic ammonium salt, a mixture of di-hydrogen ammonium phosphate and di-ammonium hydrogen phosphate in the proportion of substantially 96 parts of the former and 22 parts of the latter, and in such amounts as to maintain the hydrogen-ion concentration of said nutrient solution approximately constant during an extended period of yeast propagation therein, and propagating the yeast therein with aeration.

6. In a process of manufacturing bakers' yeast with aeration in a yeast nutrient solution, the improvements which comprise forming said nutrient solution by a process which includes adding, to a solution containing molasses and a non-toxic ammonium salt, a mixture of di-hydrogen ammonium phosphate and di-ammonium hydrogen phosphate in the proportion of substantially 96 parts of the former and 22 parts of the latter, and in such amounts as to maintain the hydrogen-ion concentration of said nutrient solution approximately constant during an extended period of yeast propagation therein, and periodically adding milk of lime thereto while propagating yeast therein with aeration.

7. In a process of manufacturing bakers' yeast with aeration in a yeast nutrient solution, the improvements which comprise forming said nutrient solution by a process which includes adding to a solution containing yeast-assimilable sugars, urea to furnish nitrogen to the yeast and adding a buffering mixture of non-toxic salts of poly-basic acids in amounts such as to maintain hydrogen-ion concentration approximately constant during an extended period of yeast propagation therein and propagating the yeast therein with aeration.

8. In a process of manufacturing bakers' yeast with aeration in a yeast nutrient solution containing yeast assimilable sugars, the improvements which comprise adding urea to the nutrient solution in an amount of approximately 10% and adding less than 10% of a mixture of di-hydrogen ammonium phosphate and di-ammonium hydrogen phosphate in the proportion of substantially 96 parts of the former and 22 parts of the latter, all proportions being based on the weight of the sugars present, and periodically adding milk of lime thereto during yeast propagation therein.

9. In a process of manufacturing bakers' yeast with areation in a yeast nutrient solution, the improvements which comprise adding a water soluable non-toxic sulfate to said yeast nutrient solution, and subsequently during yeast propagation therein adding thereto a non-toxic calcium compound adapted to re-act with the water soluble sulfate to form a precipitate of crystalline calcium sulfate which maintains the yeast in a fine state of subdivision during aeration.

10. In a process of manufacturing bakers' yeast with aeration in a yeast nutrient solution containing yeast assimilable sugars, the improvements which comprise adding about 2% ammonium sulfate by weight of the sugars present to the nutrient solution, and subsequently during yeast propagation therein adding thereto a non-toxic calcium compound adapted to re-act with the said ammonium sulfate to form a precipitate of crystalline calcium sulfate which maintains the yeast in a fine state of subdivision during aeration.

11. In a process of manufacturing bakers' yeast with aeration in a yeast nutrient solution containing molasses, the improvements which comprise forming said nutrient solution by a process which includes adding about 0.2% of chloride of lime to the molasses to react with the reducing substances present therein, adding to the treated molasses less than 5% of a mixture of di-hydrogen ammonium phosphate and di-ammonium hydrogen phosphate in a proportion of substantially 96 parts of the former to 22 parts of the latter, adding less than 10% of urea, and forming a precipitate of crystalline calcium sulfate in said solution during propagation of yeast therein, by adding a non-toxic water-soluble sulfate to said solution in the proportion of substantially 2% and adding lime to said solution, all proportions being based on the weight of the sugar present in the nutrient solution.

12. In the manufacture of bakers' yeast by the aeration process, the improvements which comprise propagating yeast with aeration in a wort which contains a yeast-assimilable sugar, adding urea as a source of yeast assimilable nitrogen and a buffer salt in amouts such as to maintain the hydrogen-ion concentration within a small range during an extended period of propagation of yeast in said wort.

13. In the manufacture of bakers' yeast by the aeration process, the improvements which comprise propagating yeast with aeration in a wort which contains a yeast-assimilable sugar, adding urea as a source of yeast assimilable nitrogen and a buffering mixture of salts of poly-basic acids such as to maintain the hydrogen-ion conecntration within a small range during an extended period of propagation of yeast in said wort.

14. In the manufacture of bakers' yeast by the aeration process, the improvements which comprise propagating yeast with aeration in a wort which contains a yeast-assimilable sugar, adding urea as a source of yeast assimilable nitrogen and a buffering mixture of salts of poly-basic acids such as to maintain the hydrogen-ion concentration within a small range during an extended period of propagation of yeast in said wort, and adding an alkali during said yeast propagation to assist in controlling the hydrogen-ion concentration.

15. In the manufacture of bakers' yeast by the aeration process, the improvements which comprise propagating yeast with aeration in a wort which contains a yeast-assimilable sugar, adding urea to furnish yeast assimilable nitrogen adding a mixture of di-hyrodgen ammonium phosphate and di-ammonium hydrogen phosphate, in such amounts as to maintain the hydrogen-ion conceneration within a small range during an extended period of propagation of yeast in said wort, and periodically during the period of propagation introducing alkaline material to assist in controlling the hydrogen-ion concentration.

16. A process of manufacturing bakers' yeast which includes propagating yeast with aeration in a nutrient solution containing yeast assimilable sugar to which nutrient solution has been added a buffering mixture of innocuous compounds in such amounts as to maintain the hydrogen-ion concentration of the solution throughout a substantial portion of the propagating period at approximately pH=6.

17. In a process of manufacturing bakers' yeast, in combination, propagating yeast with aeration in a yeast nutrient solution containing molasses as a principal sugar material, and supplying the nitrogen necessary for the propagation of high yields of yeast of good baking and keeping quality by adding a non-toxic yeast nutrient ammonium salt and urea, said urea being present in said nutrient solution in an amount not exceeding 10% of the sugars present therein.

18. In a process of manufacturing bakers' yeast, in combination, propagating yeast with aeration in a yeast nutrient solution containing molasses as a principal sugar material, and supplying the nitrogen necessary for the propagation of high yields of yeast of good baking and keeping quality by adding ammonium sulphate, ammonium phosphate and urea, said urea being present in said nutrient solution in an amount not exceeding 10% of the sugars present therein.

19. In a process of manufacturing bakers' yeast, in combination, propagating yeast with aeration in a yeast nutrient solution containing molasses as a principal sugar material, and supplying the nitrogen necessary for the propagation of high yields of yeast of good baking and keeping quality by adding ammonium sulphate and urea, and adding thereto a buffering mixture of salts of polybasic acids in such amounts as to maintain an approximately constant hydrogen-ion concentration during extended periods.

20. In a process of manufacturing bakers' yeast, in combination, propagating yeast with aeration in a yeast nutrient solution containing molasses as a principal sugar material, and supplying the nitrogen necessary for the propagation of high yields of yeast of good baking and keeping quality by adding ammonium sulphate and urea, adding thereto a buffering mixture of salt of polybasic acids in such amounts as to maintain the hydrogen-ion concentration within a small range during extended periods, and periodically adding an alkali to the nutrient solution to assist in maintaining the hydrogen-ion concentration approximately constant.

21. A process of manufacturing bakers' yeast which comprises propagating yeast with aeration in a yeast-nutrient solution, which comprises a water solution of molasses, urea and inorganic yeast-nutrient salts, the amounts of water, yeast-nutrient substances and aeration being such as to produce high yields of yeast of good baking and keeping qualities within a propagation period of 24 hours or less.

22. A process of manufacturing bakers' yeast which comprises propagating yeast with aeration in a yeast-nutrient solution, which comprises a water solution of carbohydrate material, urea and inorganic yeast-nutrient salts, the amounts of water, yeast-nutrient substances and aeration being such as to produce high yields of yeast of good baking and keeping qualities within a propagation period of 24 hours or less.

23. A process of manufacturing bakers' yeast which comprises propagating yeast with aeration in a yeast-nutrient solution, which comprises a water solution of molasses, urea and inorganic yeast-nutrient salts; said solution being substantially free from ammonical salts, the amounts of water, yeast-nutrient substances and aeration being such as to produce high yields of yeast of good baking and keeping qualities within a propagation period of 24 hours or less.

24. A process of manufacturing bakers' yeast which comprises propagating yeast with aeration in a yeast-nutrient solution, which comprises a water solution of carbohydrate material, urea and inorganic yeast-nutrient salts; said solution being substantially free from ammonical salts, the amounts of water, yeast-nutrient substances and aeration being such as to produce high yields of yeast of good baking and keeping qualities within a propagation period of 24 hours or less.

25. A process which comprises propagating yeast in a yeast nutrient solution, which comprises a water solution of carbohydrate material, a substantially pure substance urea, inorganic yeast nutrient salts and aerating same during the yeast propagation.

In testimony whereof we affix our signatures.

ARTHUR W. HIXSON.
NILS ERIK ALVAR HUGOSON.

CERTIFICATE OF CORRECTION.

Patent No. 1,745,693.                         Granted February 4, 1930, to

ARTHUR W. HIXSON ET AL.

It is hereby certified that error appears in the printed specification of the above numbered patent requiring correction as follows: Page 2, lines 34, 40 and 53, and first occurrence in line 54, for the word "or" read of; page 3, line 22 and line 31, second occurrence, for "of" read or; and that the said Letters Patent should be read with these corrections therein that the same may conform to the record of the case in the Patent Office.

Signed and sealed this 13th day of January, A. D. 1931.

(Seal)                                                  M. J. Moore,
                                                        Acting Commissioner of Patents.